No. 626,550. Patented June 6, 1899.
G. W. MOWRY.
VALVE.
(Application filed Aug. 2, 1898.)
(No Model.)
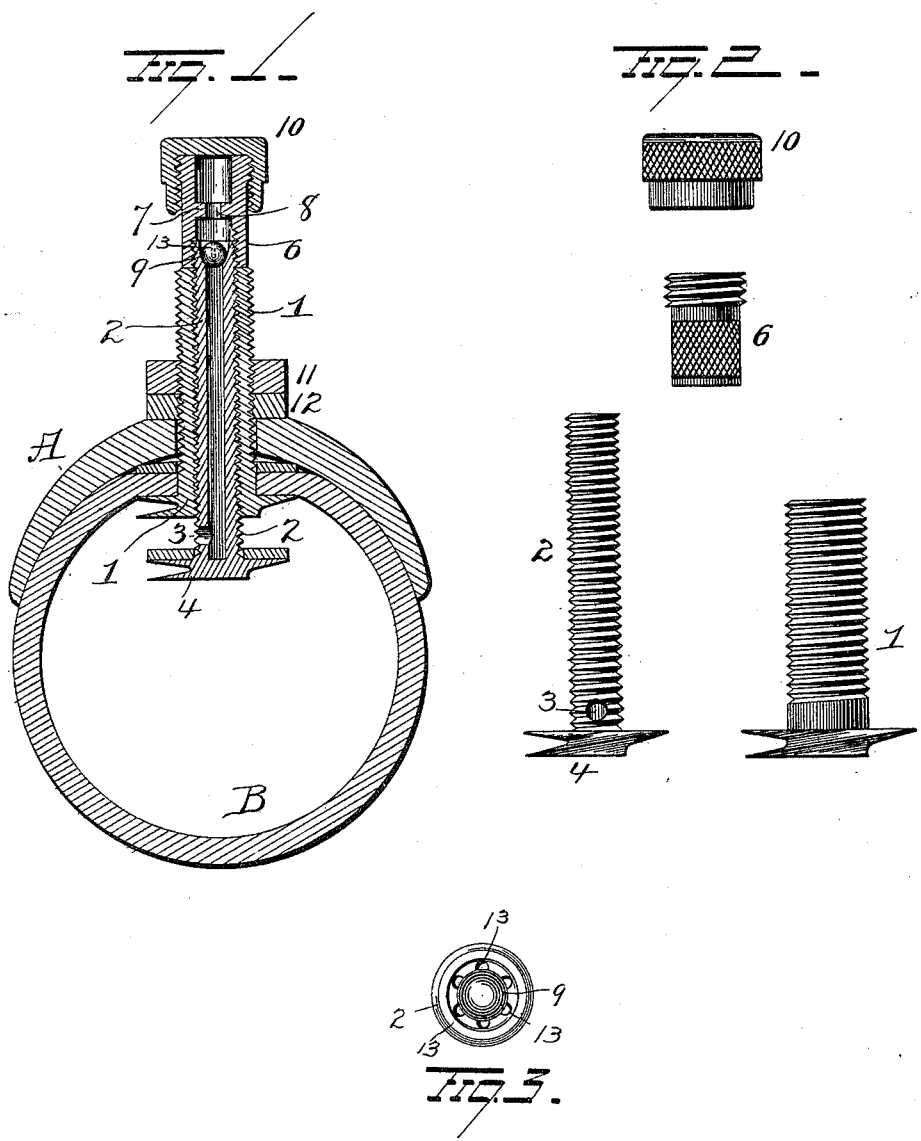

UNITED STATES PATENT OFFICE.

GEORGE WILLIAM MOWRY, OF ROCHESTER, NEW YORK.

VALVE.

SPECIFICATION forming part of Letters Patent No. 626,550, dated June 6, 1899.

Application filed August 2, 1898. Serial No. 687,551. (No model.)

*To all whom it may concern:*

Be it known that I, GEORGE WILLIAM MOWRY, a resident of Rochester, in the county of Monroe and State of New York, have invented certain new and useful Improvements in Valves; and I do hereby declare the following to be a full, clear, and exact description of the invention, such as will enable others skilled in the art to which it appertains to make and use the same.

My invention relates to an improvement in valves, and more particularly to valves for pneumatic tires, the object of the invention being to provide a valve that can be inserted at any point in a tire without the necessity of first providing a hole therein, and hence cause more or less injury to the same.

A further object is to provide a valve that will be simple in construction, comparatively cheap to manufacture, and most effectual when in use.

With these objects in view the invention consists in a valve provided at one end with means whereby to insert same through one face of the tire.

The invention further consists in the parts and combinations of parts, as will be more fully hereinafter described, and pointed out in the claims.

In the accompanying drawings, Figure 1 is a view illustrating my improvements, and Figs. 2 and 3 are views of details.

A represents a portion of rim, and B a tire of any approved construction.

My improved valve comprises a tube 1, internally and externally screw-threaded. A tube 2, longer than tube 1 and smaller in diameter, is provided externally with screw-threads adapted to mesh with the screw-threads in the tube 1 and be moved therein. A hole or opening 3 is provided near the end of tube 2, which enters the tire, whereby to admit air into the tire when the tube 2 is in the position shown in Fig. 1. The end of tube 2 is made in the form of the end of a screw, as shown at 4, and the end of the tube 1 is enlarged and made in the form of a screw or a continuation of the screw formed by the end of tube 2, as clearly shown at 5 of the drawings.

A cap 6 is provided internally with threads to engage the threads on the tube 2, whereby to turn the tube 2 and open and close the air-inlet opening 3, and said cap is provided with an intermediate partition 7, having a hole 8 therein to permit the air to freely pass thereinto. A ball or check valve 9 is disposed between the upper end of the tube 2 and the partition. The hole in the upper end of tube 2 is made in its wall with a series of inlet channels or passages 13 to permit the entrance of air into the tire when the ball is forced against the top of tube 2. The cap 6 is provided with external screw-threads at its outer end to receive threads in a stopper 10, whereby to effectually close the valve.

Suitable nuts 11 12 may be provided on the tube 1 and adapted to engage the screw-threads thereon, whereby to effectually lock the valve to the rim of the wheel.

The operation of my improved valve is as follows: When it is desired to inflate the tire, it is simply necessary to turn the cap 6, thus turning the tube 2 and closing the opening 3. The stopper 10 is then removed and the pump or other inflating apparatus connected with the end of the cap 6, when the cap can be turned and the tube turned to open the inlet-opening 3 and air forced into the cap. It will be seen that as the opening in the top of tube 2 is made in its wall with a series of channels or passages 13 the air will pass around the ball-valve 9 and into the tube 2 and tire. When a sufficient amount of air has entered the tire, the air-pressure from the tire will force the ball-valve 9 against the opening in the partition 7 of the cap 6 and prevent any escape of air during the operation of the inflating apparatus and when the latter is being removed. After the removal of the pump the stopper 10 will be put on and the cap 6 screwed down.

I would have it understood that I do not limit myself to my improved screw end on the particular construction of valve above described, but consider myself at liberty to use same on any approved valve; nor do I limit myself to the various details above set forth, but consider myself at liberty to make such slight changes and alterations as fairly fall within the spirit and scope of my invention.

Having fully described my invention, what I claim as new, and desire to secure by Letters Patent, is—

1. A valve for a pneumatic tire having an enlarged end or head consisting of a screw adapted to pass through a hole in the tire of less diameter than that of said screw, substantially as set forth.

2. The combination with a pneumatic tire, of a valve comprising an outer tube and an inner tube and a portion of a screw on the end of each tube whereby when said ends are together the valve may be easily inserted into said tire.

3. The combination with a pneumatic tire, of a valve comprising an inner and outer tube, a cap on the upper end of the inner tube whereby to move said inner tube in said outer tube and the ends of said tubes forming a screw for easy insertion in the tire.

4. The combination with a pneumatic tire, of tubes connected therewith and constituting a positive valve within the tire, a check-valve and a chamber in which said check-valve can move, the inlet-opening of said chamber having channels in its walls.

5. In a valve, the combination with a casing, of a positive valve, a valve-chamber within said casing, a check-valve in said chamber and channels in the wall of the inlet-opening of said chamber, substantially as set forth.

In testimony whereof I have signed this specification in the presence of two subscribing witnesses.

GEORGE WILLIAM MOWRY.

Witnesses:
WM. J. MCPHERSON,
C. BEARDSLEY.